Nov. 23, 1971          S. NOVAKOVIC          3,621,578
                    NAVIGATIONAL INSTRUMENT
Filed Sept. 22, 1969                      2 Sheets-Sheet 1

INVENTOR.
STEPHEN NOVAKOVIC
BY Bosworth, Sessions
Hernstrom + Cain
ATTORNEYS

United States Patent Office 3,621,578
Patented Nov. 23, 1971

3,621,578
NAVIGATIONAL INSTRUMENT
Stephen Novakovic, 3718 Library St.,
Cleveland, Ohio 44109
Filed Sept. 22, 1969, Ser. No. 859,842
Int. Cl. G01b 5/24
U.S. Cl. 33—1 SB          7 Claims

ABSTRACT OF THE DISCLOSURE

A navigational instrument is provided adapted for direct reading as a guide in quickly determining navigational data, distances from fixed locations, true wind speed, true wind angle, and the like.

In one form, the instrument comprises an angle scale, preferably 360 degrees, having a plurality of arms pivotally mounted at its center. By positioning the arms on the scale at certain angles and utilizing a reading arm, certain navigational data can be quickly ascertained, both for motor ships and sailboats.

BACKGROUND AND SUMMARY OF THE INVENTION

The present invention relates to a navigational instrument and, more particularly, to a maneuvering calculator or aid for quickly determining various navigational data useful or necessary for further deployment of a craft, especially a water craft.

In boating, a pilot or helmsman frequently needs to calculate certain data as a guide in navigating the craft. At times, even when fully occupied with other duties of handling the craft, a boatsman must quickly and accurately determine such data with a minimum waste of time.

The present navigational instrument is of simple construction and yet easily provides such navigational information as the distance from a fixed location, for example, a fixed point on shore, and the distance the craft will be when such fixed point is at the beam of the craft. The instrument can also be used in sailing as to determine the true angle of the wind and true speed of the wind, so that a helmsman may know along what course to tack in order to reach a predetermined point. In either case, the need for knowledge and use of mathematical functions, such as trigonometric functions, is entirely eliminated.

In the preferred form, the present instrument comprises an angle scale, preferably an entire 360 degrees, and at least three arms having a common connection to the angle scale at its center. At least two of the three arms are pivotally connected at such center. Another arm, the reading arm, may be optionally used, depending upon the navigational data sought. All of the arms bear the same units of linear measurement.

For determining distance, for example, two of the three commonly connected arms are set at certain navigational angles, and the third arm is set at a predetermined angle on the scale normally 90 degrees. The reading arm is mounted to slide along the third arm and read in conjunction with the other two pivotally set arms to provide the information desired. For determining the true angle and speed of the wind, the reading arm is removed from the third arm, all three pivotally mounted arms are set at certain navigational angles, and the reading arm then used in conjunction with all three of such arms to provide the speed and angle readings sought.

BRIEF DESCRIPTION OF THE DRAWINGS

The accompanying drawings illustrate presently preferred embodiments wherein.

DESCRIPTION OF THE PREFERRED EMBODIMENTS

Figure 1:
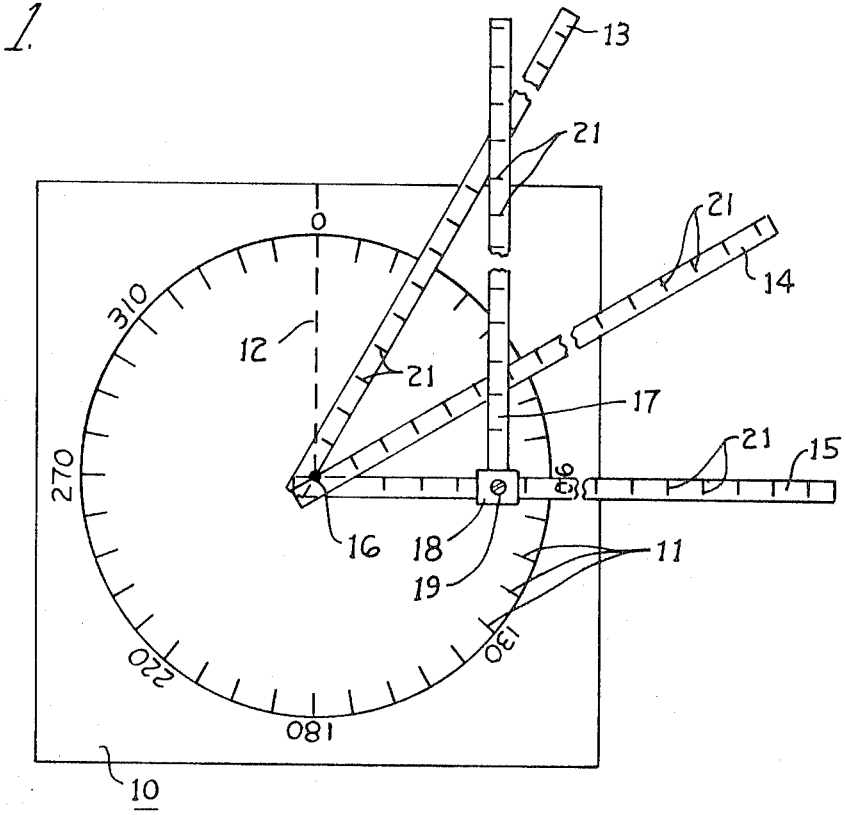
FIG. 1 is a plan view of the present navigational instrument wherein the arms are set for a reading of distance.

Referring initially to the structure of the navigational instrument, the embodiment of FIG. 1 comprises a plane, angle, scale, generally indicated at 10, in the nature of a protractor, which preferably shows an entire circle of 360 degrees and has indicia 11 suitably divided so that angles can be plotted on the scale, starting from the "zero" line 12. Three arms 13, 14, and 15 have a common pivotal point at the center 16 of the scale 10. A fourth arm 17, herein referred to as the reading arm, is fixed to a sleeve 18 free to engage and slide along arm 15. If desired, the sleeve may have a set screw 19 tentatively to fix the position of the reading arm 17 on arm 15. All of the arms have the same units of measurement scaled along their length, such as inches, centimeters, etc., such indicia being generally shown at 21. To indicate distance, the reading arm 17 is slidably mounted on arm 15 as shown in FIG. 1 but to indicate angle of true wind direction and true wind speed, the reading arm 17 is removed from arm 15 and employed in a different manner as hereinafter described.

In using the instrument to determine distance as from a fixed point on shore, a bearing reading is taken with respect to that point from two stations along the line of course or travel of the ship. An arm is set on the scale for each of the two bearing readings, and the third arm is set at a predetermined angle on the scale, normally 90 degrees. Knowing the distance of the run between two stations on the course (as from a time-speed consideration), the reading arm is moved along the third arm until that distance as measured on the scale of the reading arm is exactly measured between the scales of the first pivot arm and the second pivot arm. The linear distance measured along the second arm up to its intersection with the reading arm is then the distance the craft is from the fixed point on shore at that moment. This use of the instrument is exemplified by the following example.

Example 1.—Measurement of distance

Figure 2:
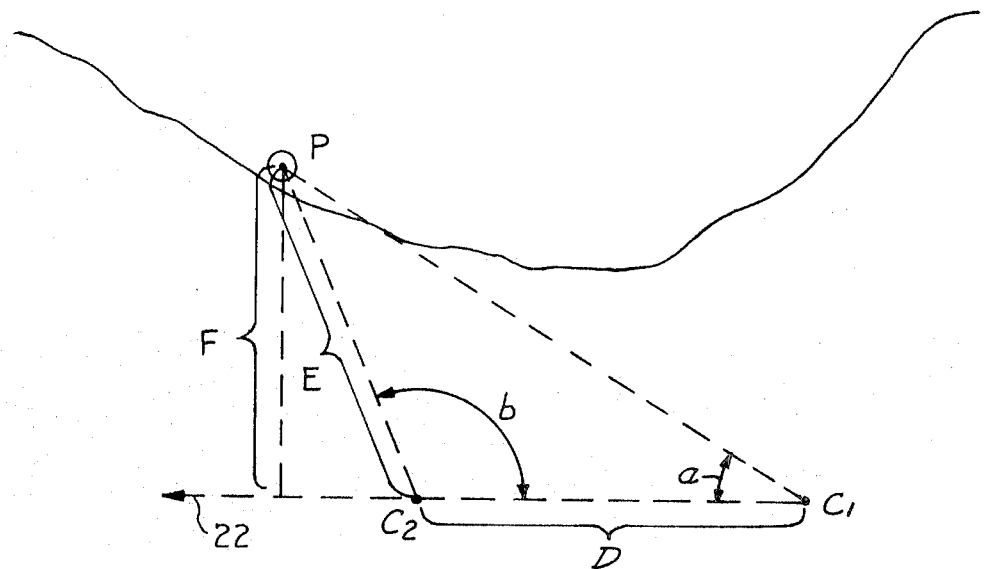
FIG. 2 is a schematic representation of land and a water craft distant from the land.
Figure 3:
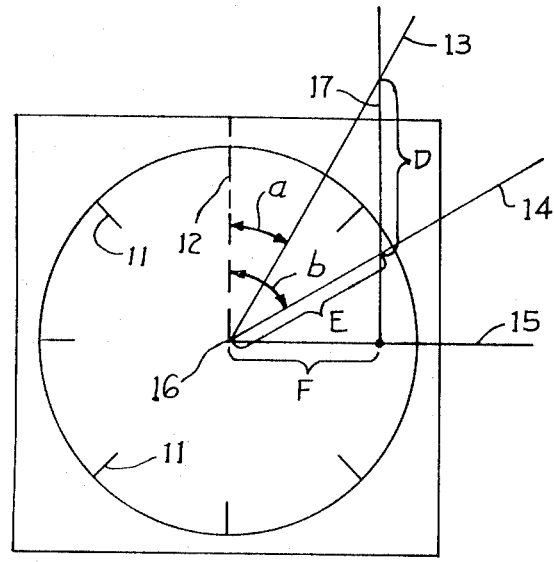
FIG. 3 is a schematic illustration of one setting of the navigational instrument for determining distance from a fixed point on land, as in the situation represented by FIG. 2.

Referring principally to FIGS. 2 and 3, a craft indicated at $C_1$ is traveling in a line of course indicated by the arrow 22. A fixed point P, such as a tower, is sighted on land L. Only two angle readings are taken. Angle $a$ is read when the craft is at $C_1$, as by a conventional pelorus fixed on the point P, and angle $b$ is read when the craft is at $C_2$. Knowing the speed of the craft and the elapsed time in passing from $C_1$ to $C_2$, all noted by conventional equipment, the distance D between $C_1$ and $C_2$ is easily calculated.

In applying these data (FIG. 3), arm 13 is set at angle $a$ from the zero line 12, arm 14 is set at angle $b$, and arm 15 is set at a predetermined angle, shown in FIG. 3 as 90 degrees. Then reading arm 17 is moved along arm 15 by tht sleeve 18, until the distance D as measured by the units on the scale of arm 17 equals the distance between arms 13 and 14. The distance E that the craft is from the point P at $C_2$ is then determined by noting the distance on arm 14 from the center 16 on the scale 10 out to the intersection with the arm 17. Further, the distance the craft will be from the point P when the latter is abeam of the craft is given by the distance F, read on the scale of arm 15.

A sailboat does not follow a direct line of travel to an objective but must necessarily tack as is well known in the art. In order to tack properly and take advantage of a prevailing wind, a helmsman must know the true wind speed and the true wind angle or direction of that wind. Neither value is easily obtained while a craft is in motion, since its own travel makes the wind appear to be coming from a different angle than is actually the case, and similarly the speed of the craft presents an accurate determination of the actual or true wind speed.

To use the present instrument to measure the true wind angle and true speed, arm 17 is removed from arm 15. The data taken for use with the instrument for this purpose include the angle of the straight line course to the objective with respect to a certain compass point, for example, north; the boat speed as from a water speedometer; the apparent wind speed as from an aerometer; and the apparent wind angle with respect to tht same compass point, as by a weather vane. To use the instrument in this case, an arm is set on the scale for each of the angle readings, that is, the course angle and the apparent wind angle. A distance is measured along the first arm equivalent to the boat speed. For example, one unit of linear measurement can be taken as one mile per hour or multiple thereof. Similarly, a distance is measured along the second arm equivalent to the apparent wind speed. The reading arm is then laid across the two resultant points on the two arms. The distance as measured on the reading arm is then equivalent to the true wind speed, and the angle that the reading arm makes with the vertical (corresponding to the compass point taken, usually true north) is the true wind angle. The true wind speed can thus be directly read from the reading arm. The true wind angle can be transferred to the scale by a parallelogram technique to read its value on that scale. This use of the instrument is exemplified by the following example.

Example 2.—Measurement of true wind speed and direction

Figure 4:
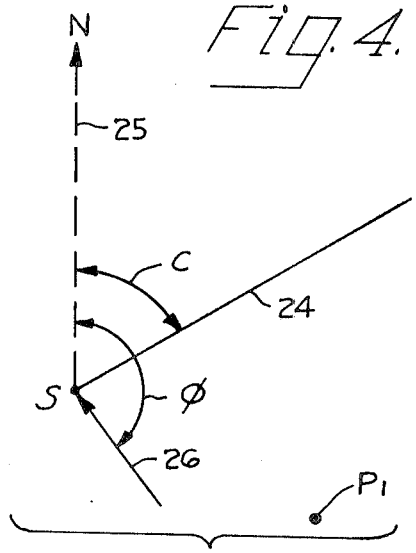
FIG. 4 is a sechematic representation of a sailing craft attempting to reach an objective location under the influence of a cross-angled wind.
Figure 5:
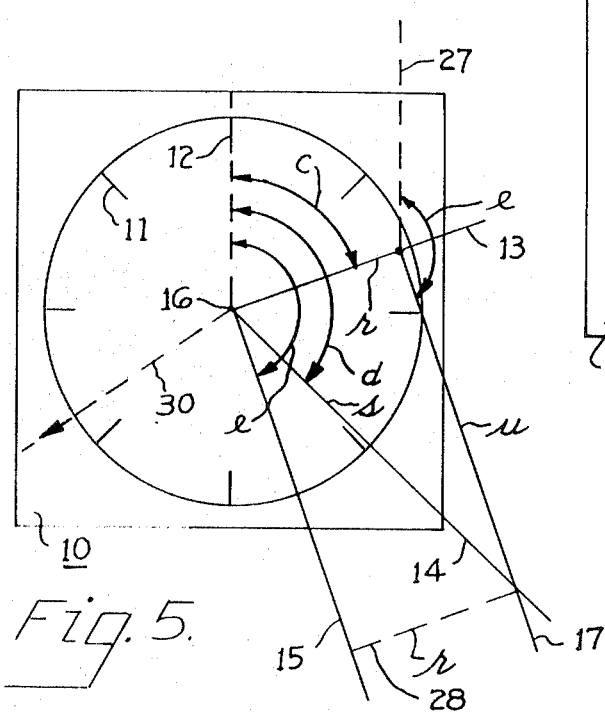
FIG. 5 is a schematic illustration of one setting of the present instrument for determining the true angle and true speed of the wind in the situation represented by FIG .4.

Referring to FIGS. 4 and 5, a sailboat S desires to reach a point $P_1$ and is presently sailing along a course line 24 which makes an angle $c$ with a true north line 25. Other compass points could be used if desired. By conventional instruments, it is determined that the sailboat S is proceeding at $r$ miles per hour ( or knots), and the apparent wind speed is $s$ miles per hour in the direction of the arrow 26 at an apparent wind angle $d$.

In applying these data (FIG. 5) arm 13 is set at angle $c$ from the zero line 12, and arm 14 is set at the angle $d$. The speed $r$ of the sailboat is then measured along arm 13, taking for example one unit such as an inch for each mile per hour. Similarly, the apparent speed $s$ of the wind is measured along arm 14. The distance $u$ between the arms 13 and 14, as measured from the points established by the values $r$ and $s$, is determined by laying the reading arm across 13 and 14 at those points and reading the distance $u$ by the linear scale on the reading arm 17. This value is the true wind speed as expressed in the same units by which the speeds of the sailboat and wind were measured on the arms 13 and 14, respectively.

Moreover, the angle $e$ which arm 17 makes with a vertical 27 is the true wind angle. The present instrument is adapted to transfer the angle $e$ to the center 16 of the scale 10, so that the value of this angle may be easily read off the indicia 11. To accomplish this, arm 14 is maintained in place (as determined by the angle $d$). The reading arm 17 is placed to intersect arm 14 at the point determined by $s$ and to intersect arm 15 at a distance away equal to $r$. Arm 15 is pivoted until the distance from arm 14 to arm 15 is equal to the value $r$. This value is again measured along the scale on arm 17 which is now at the position as shown in FIG. 5 by the dotted line 28. The angle that arm 15 now makes with the vertical or zero line 12 is $e$, the true wind angle. With this information at hand, a helmsman can calculate a direction of tack.

For example, the angle between lines 13 and 15 can be determined as from the indicia 11 on scale 10. This angle is then added to angle $e$ to provide a dotted line 30. This line indicates to the helmsman the next course of tack under the described conditions, the ship being directed along line 30 in the direction of the indicated arrowhead. The helmsman proceeds along this line until making his next tack or change of direction which can be similarly determined.

The disposition of dottted line 30 can also be fixed by use of reading arm 17. With arms 13 and 15 in position as shown in FIG. 5, arm 14 is swung to the left of arm 15 as there viewed. The reading arm 17 is first used to measure the distance from value $u$ on arm 15 to value $r$ on arm 13. Then, with that distance or value in mind and arm 15 stationary, reading arm 17 is used to position arm 14 by measuring such value in the same linear units from the end of value $u$ on arm 15 to coincide with or reach arm 14, much as in the same manner as arm 15 was positioned to transfer angle $e$ to the center 16, as previously described. The resultant position of arm 14 is the same as dotted line 30 indicated in FIG. 5.

Figure 6:
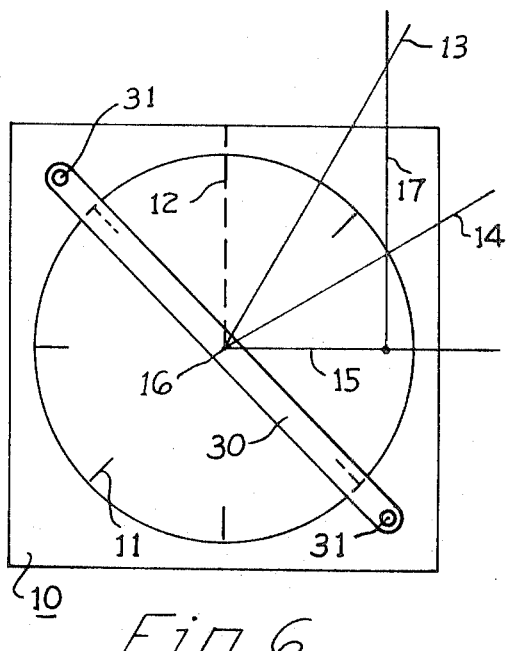
FIG. 6 is a semi-schematic plan view of the present navigational instrument and illustrates how it may be combined with the scale of a conventional pelorus.

FIG. 6 illustrates that the present navigational instrument may be combined with a standard pelorus, frequently used in boating. The setting of the instrument in FIG. 6 of the present instrument is that of FIG. 1, and therefore like parts have been designated by like reference numerals. In this case, the scale 10 of the instrument is also the dial of the pelorus. As is known in the art, a pelorus comprises a band 30 rotatably mounted at its center and having upstanding sight vanes 31 (shown in plan) at each end. The present instrument as used in the form of FIG. 5 may also be similarly combined with a dial of a pelorus.

Various modifications are possible with the present invention. Although the instrument has been described in connection with water craft, it is also applicable for use on land. The scale 10 and indicia 11 need not comprise a full circle but can be a semi-circle or even only a sector of a circle, as long as the scale can accommodate the maximum angle likely to be plotted. If relatively large linear distances are involved, possibly beyond the capacity of the lengths of the various arms, it is only necessary to divide such distances by an integer and reduce them to workable values. Of course, the end linear results should then be multiplied by the same integer to obtain the correct answers from the instrument.

The present navigational instrument eliminates the use of rulers, drawing vector diagrams, and the like, which often is quite difficult to accomplish on a pitching and vibrating boat. Similarly, it is not necessary to have trigonometric tables or even a knowledge of their use. Instead, only angle readings, the speeds of travel and time are data required. The present instrument eliminates the actual mathematical calculations and provides the answers sought in an easy and quick manner. The instrument is versatile in that it may be used with either power craft or sailboats.

Although the foregoing describes several embodiments of the invention, it is understood that the invention can be practiced in still other forms within the scope of the following claims.

What is claimed is:

1. A direct reading navigational instrument for use with data observed from at least two different physical locations of the instrument with respect to a fixed point, comprising:
   (a) a plane angle scale having a reference reading point,
   (b) three arms having a common connection to said angle scale at its center, at least two of said arms having a pivotal connection, and all three arms bearing the same units of linear measurement therealong,
   (c) a first arm being adapted to be set on said angle scale at a predetermined angle from the reference reading point of the angle scale,
   (d) a second of said arms being rotatably mounted on the scale and adapted to be set on said scale at an angle from the reference point which is less than said predetermined angle of said first arm and which corresponds to an angle reading on said fixed point with said instrument at one physical location thereof,
   (e) a third of said arms being rotatably mounted on the scale and adapted to be set on said scale at an angle from the reference point which is less than said predetermined angle of said first arm and which corresponds to an angle reading on said fixed point with said instrument at another physical location thereof, and
   (f) a reading arm adapted to be moved along said first arm at a fixed intersecting angle therewith and having a length to contact both said second and third arms, whereby stationing said reading arm along said first arm until a distance on the scale of said reading arm, corresponding to the distance between said two physical locations of the instrument at which angle readings were taken, matches the distance between said second and third arms, and the then distance on the scale of said first arm as measured from the intersection of said reading arm with said first arm to the center of the angle scale corresponds to the distance the instrument is from said fixed point at the second angle reading.

2. The navigational instrument of claim 1 wherein said angle scale is that of a pelorus.

3. The navigational instrument of claim 1 wherein said first arm is also pivotally joined at said center of the angle scale, and said reading arm is removable from said third arm and adapted to be laid across said other arms in determining other navigational data.

4. The navigational instrument of claim 3 wherein said angle scale is that of a pelorus.

5. The navigational instrument of claim 1 wherein said predetermined angle of said first arm on the angle scale is 90 degrees.

6. The navigational instrument of claim 1 wherein said fixed intersecting angle of the reading arm with said first arm is 90 degrees.

7. The navigational instrument of claim 1 adapted for measuring the true wind angle and true wind speed wherein:
   (a) a first arm is adapted to be set on said angle scale at an angle from the reference point corresponding to the course angle in which said instrument moves,
   (b) a second arm is adapted to be set on said angle scale at an angle from the reference point corresponding to the apparent wind angle,
   (c) said reading arm is adapted to be removed from said arm along which it is movable and placed across said first and second arms, whereby intersecting the reading arm on the scale of said first arm at a value corresponding to the speed of the instrument and simultaneously intersecting the reading arm on the scale of said second arm at a value corresponding to the apparent speed of the wind provides a distance on the scale of the reading arm between said two intersections that corresponds to the true wind speed, and the angle of said reading arm in that position with respect to a radial line drawn through the reference point on said angle scale is the true wind angle.

References Cited
UNITED STATES PATENTS

| | | | |
|---|---|---|---|
| 462,234 | 11/1891 | Brotherhood | 33—64 R |
| 1,917,278 | 7/1933 | Weems | 33—76 VA |
| 2,347,703 | 5/1944 | Maris | 33—76 VA |
| 2,370,753 | 3/1945 | Reece | 33—98 |
| 2,465,481 | 3/1949 | Reiche | 33—76 VA |
| 2,697,234 | 12/1954 | Sturdevant | 33—64 R X |

WILLIAM D. MARTIN, Jr., Primary Examiner

U.S. Cl. X.R.

33—76 VA, 97